United States Patent
Kundmann et al.

[11] Patent Number: 5,905,757
[45] Date of Patent: May 18, 1999

[54] FILTER CO-PROCESSOR

[75] Inventors: Thomas Kundmann, Streamwood; Mack Mansouri, Wheeling, both of Ill.; Moshe Tarrab; Eran Pisek, both of Holon, Israel

[73] Assignee: Motorola, Inc., Schaumburg, Ill.

[21] Appl. No.: 08/725,871

[22] Filed: Oct. 4, 1996

[51] Int. Cl.[6] .................................................... H03H 7/30
[52] U.S. Cl. ............................................ 375/229; 375/343
[58] Field of Search .................................. 375/229, 230, 375/343, 231, 341; 364/724.01, 427.1, 728.01

[56] References Cited

U.S. PATENT DOCUMENTS

| | | | |
|---|---|---|---|
| 4,716,577 | 12/1987 | Oexmann | 375/235 |
| 4,868,868 | 9/1989 | Yazu et al. | 381/37 |
| 5,031,193 | 7/1991 | Atkinson et al. | 375/231 |
| 5,063,573 | 11/1991 | Langewellpott | 375/232 |
| 5,245,611 | 9/1993 | Ling et al. | 375/235 |
| 5,251,233 | 10/1993 | Labedz et al. | 375/230 |
| 5,267,264 | 11/1993 | Shlenker et al. | 375/231 |
| 5,283,780 | 2/1994 | Schuchman et al. | 371/34 |
| 5,400,271 | 3/1995 | Himeno | 364/750.5 |
| 5,499,272 | 3/1996 | Bottomley | 375/347 |
| 5,513,223 | 4/1996 | Shoji | 375/350 |

*Primary Examiner*—Tesfaldet Bocure
*Attorney, Agent, or Firm*—Richard A. Sonnentag

[57] ABSTRACT

A filter co-processor within a Digital Signal Processor (DSP) takes advantage of the orthogonal nature of modulated signals during the equalization process. Since, after reception, only certain real/imaginary values of the received signal are useful for demodulation, the filter co-processor only processes those values to estimate the transmitted signal. By processing only those values useful for demodulation, the filter co-processor is able to process more information in a given amount of time, leading to increased processing when compared to the prior art.

6 Claims, 11 Drawing Sheets

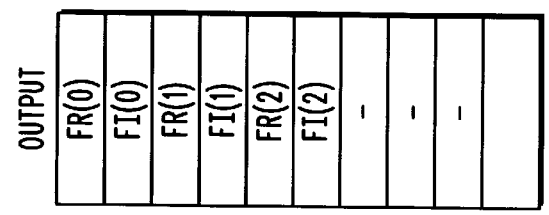
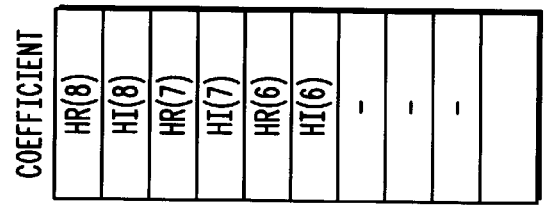
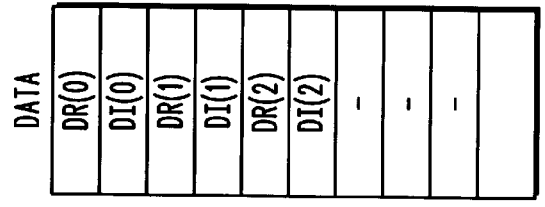
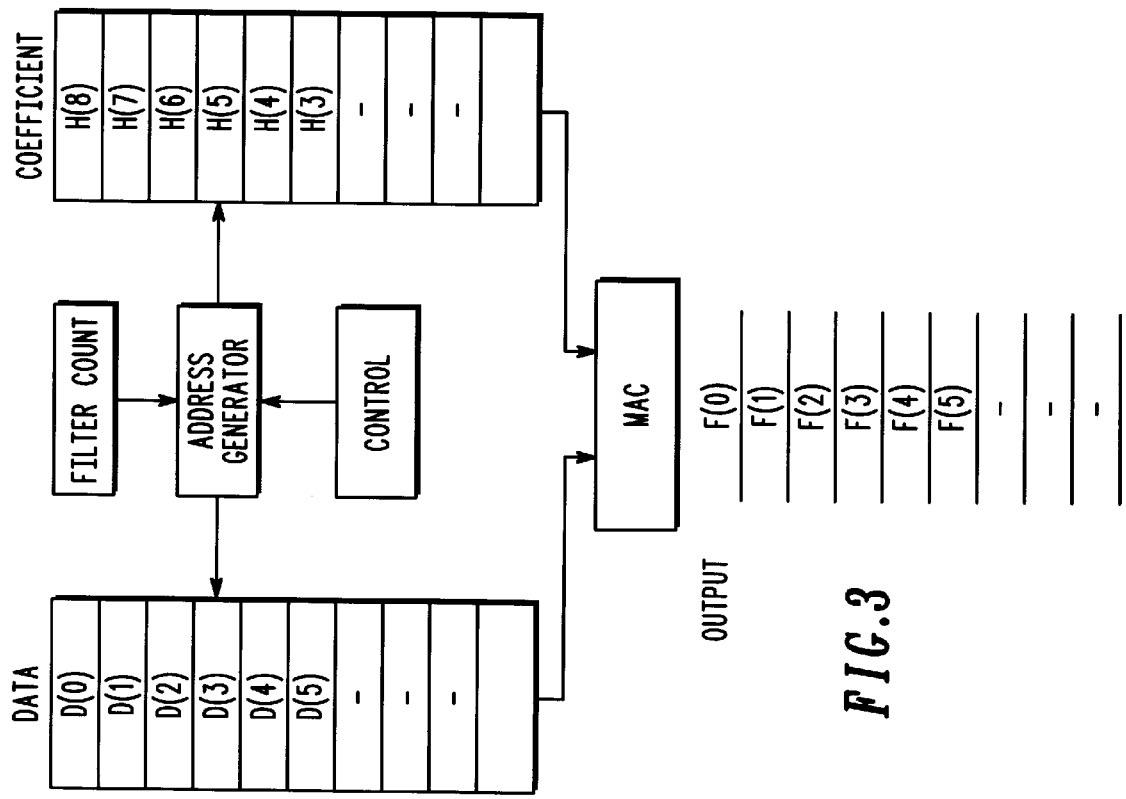

| SAMPLE (INDEX) | BIT# | RECEIVED I | RECEIVED Q | MIDAMABLE I | MIDAMABLE Q |
|---|---|---|---|---|---|
| 0 | 0 | DR(0) | DI(0) | HR(0) | 0 |
| 1 | 1 | DR(1) | DI(1) | 0 | HI(1) |
| 2 | 2 | DR(2) | DI(2) | HR(2) | 0 |
| 3 | 3 | DR(3) | DI(3) | 0 | HI(3) |
| 4 | 4 | DR(4) | DI(4) | HR(4) | 0 |
| 5 | 5 | DR(5) | DI(5) | 0 | HI(5) |
| 6 | 6 | DR(6) | DI(6) | HR(6) | 0 |
| 7 | 7 | DR(7) | DI(7) | 0 | HI(7) |

| SAMPLE (INDEX) | BIT# | RECEIVED I | RECEIVED Q | MIDAMABLE I | MIDAMABLE Q |
|---|---|---|---|---|---|
| 0 | 0 | DR(0) | DI(0) | HR(0) | 0 |
| 1 |   | DR(1) | DI(1) | 0 | 0 |
| 2 | 1 | DR(2) | DI(2) | 0 | HI(2) |
| 3 |   | DR(3) | DI(3) | 0 | 0 |
| 4 | 2 | DR(4) | DI(4) | HR(4) | 0 |
| 5 |   | DR(5) | DI(5) | 0 | 0 |
| 6 | 3 | DR(6) | DI(6) | 0 | HI(6) |
| 7 |   | DR(7) | DI(7) | 0 | 0 |

FILTER CO-PROCESSOR

FIELD OF THE INVENTION

The present invention generally relates to co-processors, and more particularly to filter co-processors implemented in digital signal processors.

BACKGROUND OF THE INVENTION

Current wireless communication systems, such as digital cellular systems, require extensive digital signal processing to perform channel equalization, channel coding/decoding, and speech coding. One such digital cellular system is the Groupe Special Mobile (GSM) digital cellular system. In a typical GSM digital cellular system configuration, a separate Digital Signal Processor (DSP) is dedicated to a timeslot, thus eight DSPs are required to equalize a single radio frequency (RF) carrier. However, each output from the equalizer must be input into another separate DSP to perform channel decoding. All total, 16 DSPs are necessary to equalize/decode a single RF carrier.

When considering the large number of RF carriers deployed in a cellular system such as GSM, the number of DSPs used within a receiver becomes expensive. In addition to cost, the size of the DSP is such that a large number consumes large portions of valuable real estate within the receiver. Additionally, the large number of DSPs dissipate a corresponding amount of heat that must be removed from the receiver. All said, the large number of DSPs implemented in a receiver as described above is wrought with disadvantages. Thus, a need exists for a way to receive the same number of signals present on a single RF carrier without the need for the large number of dedicated DSPs as in the prior art.

BRIEF DESCRIPTION OF THE DRAWINGS

FIG. 2 depicts a general organization of data, coefficients and output for use in the filter co-processor of FIG. 1.

FIG. 3 through FIG. 12 depict the general data organization as shown in FIG. 2 for varying decimation values of correlation and convolution for modes 0 and 1 as applied to the hardware architecture of FIG. 1.

DETAILED DESCRIPTION OF A PREFERRED EMBODIMENT

Figure 1:
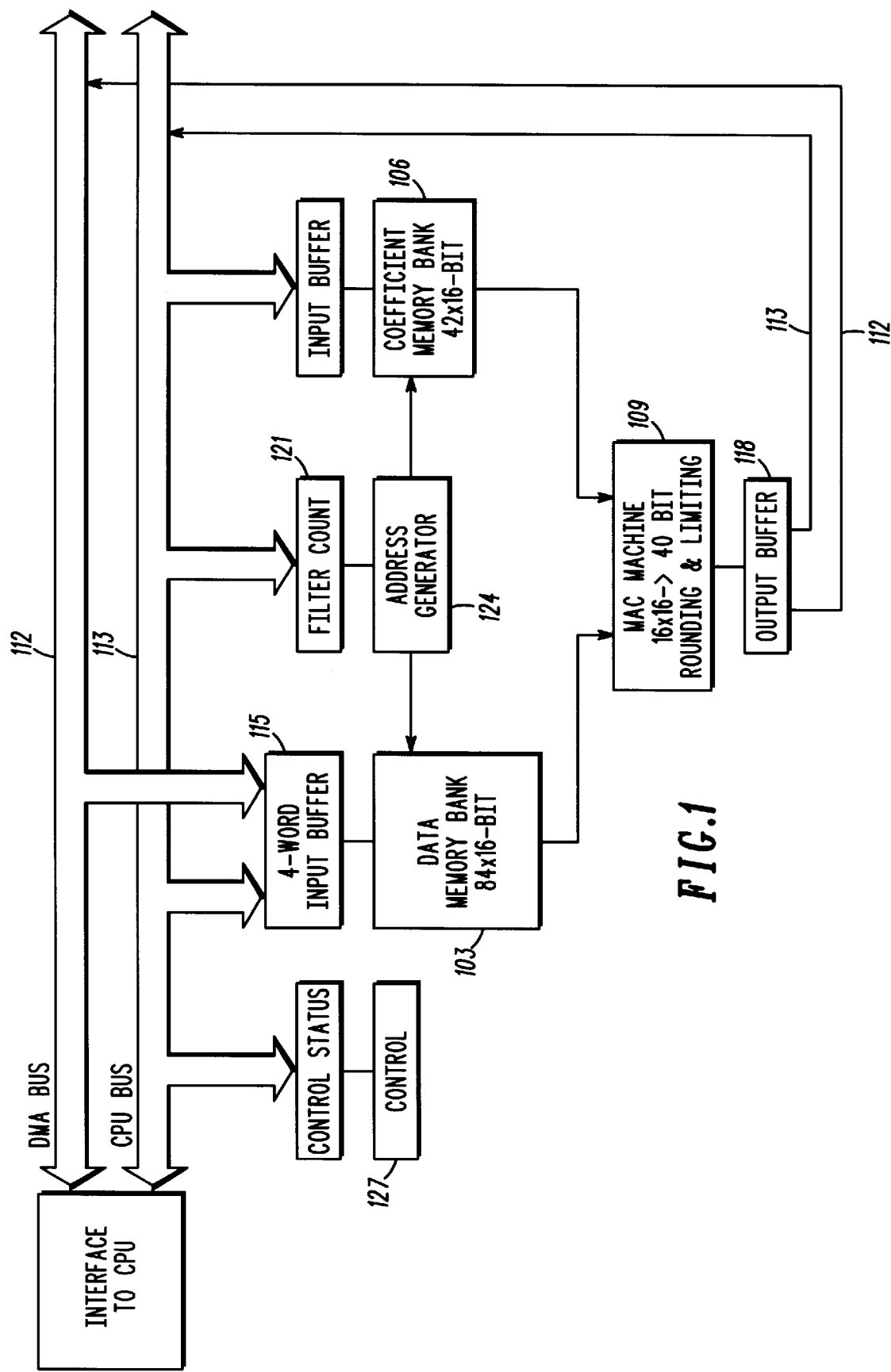
FIG. 1 generally depicts, in block diagram form, the hardware architecture of a filter co-processor in accordance with the invention.

Generally stated, a filter co-processor within a Digital Signal Processor (DSP) takes advantage of the orthogonal nature of modulated signals during the equalization process. Since, after reception, only certain real/imaginary values of the received signal are useful for demodulation, the filter co-processor only processes those values to estimate the transmitted signal. By processing only those values useful for demodulation, the filter co-processor is able to process more information in a given amount of time, leading to increased processing when compared to the prior art.

In the preferred embodiment, the filter co-processor includes a first memory for storing data information and a second memory for storing coefficients. The filter co-processor also includes a controller for controlling a multiplier/accumulator to perform multiply/accumulate functions in a plurality of modes of operation and for coordinating retrieval of the data information and the coefficients.

In the preferred embodiment, a mode of operation further comprises a correlation between a complex data sequence and a mid-amble sequence, where the mid-amble sequence comprises alternating pure real/pure imaginary complex values. Additionally, another mode of operation comprises a decimation of the output of the correlation. In the embodiment related to the correlation, another mode of operation also comprises a correlation between a 2X oversampled complex data sequence and a mid-amble sequence, where the mid-amble sequence comprising 1X alternating pure real/pure imaginary complex values.

Also in the preferred embodiment, a mode of operation further comprises matched filtering where the input data is complex, coefficients related to the matched filtering are complex, and the output is a real sequence of alternating pure real/pure imaginary data. Another mode of operation comprises a decimation of the output of the matched filtering.

The filter co-processor described above generates an output for use by a Maximum Likelihood Sequence Estimation (MLSE) algorithm. The coefficients of the filter co-processor comprise channel response coefficients and matched filter coefficients. To minimize intervention with a central processing unit, the filter co-processor operates in a mode of operation where a direct memory access apparatus is used to move input data from the memory to the filter co-processor and an output from the filter co-processor to the memory.

The filter co-processor has application to an equalizer for use in a receiver compatible with a wireless communication system. In this embodiment, the equalizer comprises a correlation block for correlating a complex data sequence and a mid-amble sequence, the mid-amble sequence comprising alternating pure real/pure imaginary complex values and a matched filtering block for matched filtering complex input using complex coefficients and outputting a real sequence of alternating pure real/pure imaginary data. A maximum likelihood sequence estimation (MLSE) block estimates a signal transmitted in the wireless communication system based on the output of the matched filtering block.

In this embodiment, the correlation block and the matched filtering block are implemented utilizing first and second memory and a controller for controlling a multiplier/ accumulator to perform multiply/accumulate functions in a first mode related to the correlation and a second mode related to the matched filtering. The first mode related to the correlation and the second mode related to the matched filtering are performed in the filter co-processor within a digital signal processor.

FIG. 1 generally depicts the hardware architecture of a filter co-processor in accordance with the invention. In the preferred embodiment, the filter co-processor is a Finite Impulse Response (FIR) co-processor. As shown in FIG. 1, the system is comprised of a data memory bank 103 and a coefficient memory bank 106 coupled to a multiplier/ accumulator (MAC) 109. The size of the memory banks are left to the hardware designer, but should be large enough to accommodate the GSM telecommunication standard. Also shown in FIG. 1 are two dedicated direct memory access (DMA) channels 112 and 113, the first 112 for data transfer into the data memory bank and the second 113 for data transfer of the FIR results back to the Central Processing Unit CPU. With this configuration, the amount of CPU intervention is minimized to initialization only. A four-word input buffer 115 and a one-word output buffer 118 interface between the DMA transfer process and the FIR data acquisition process. The filter count 121 is in charge of controlling the FIR filter length. The address generator 124 is responsible for generating the address pointers to the memory banks 103 and 106 according to a selected mode. The control unit 127 controls the FIR operation and interfaces to the CPU.

As shown in FIG. 1, only one Multiply/Accumulate (MAC) operation per clock cycle is performed. This architecture provides maximum flexibility to support a wide variety of FIR filtering applications, while maintaining minimal computation steps for each application. This contributes to the cost effective solution in terms of area and total computation time.

As mentioned above, the architecture of the filter co-processor shown in FIG. 1 is capable of supporting multiple modes.

In the preferred embodiment, four modes of operations (configured by 2 mode bits) are supported:
1. Mode 0—Real FIR filter.
2. Mode 1—Complex FIR filter.
3. Mode 2—Complex FIR filter generating Pure Real/Pure Imaginary outputs alternately.
4. Mode 3—Complex correlation between a fully complex data sequence and a complex sequence composed of alternate Pure_Real/Pure Imaginary data elements.

Figure 5:
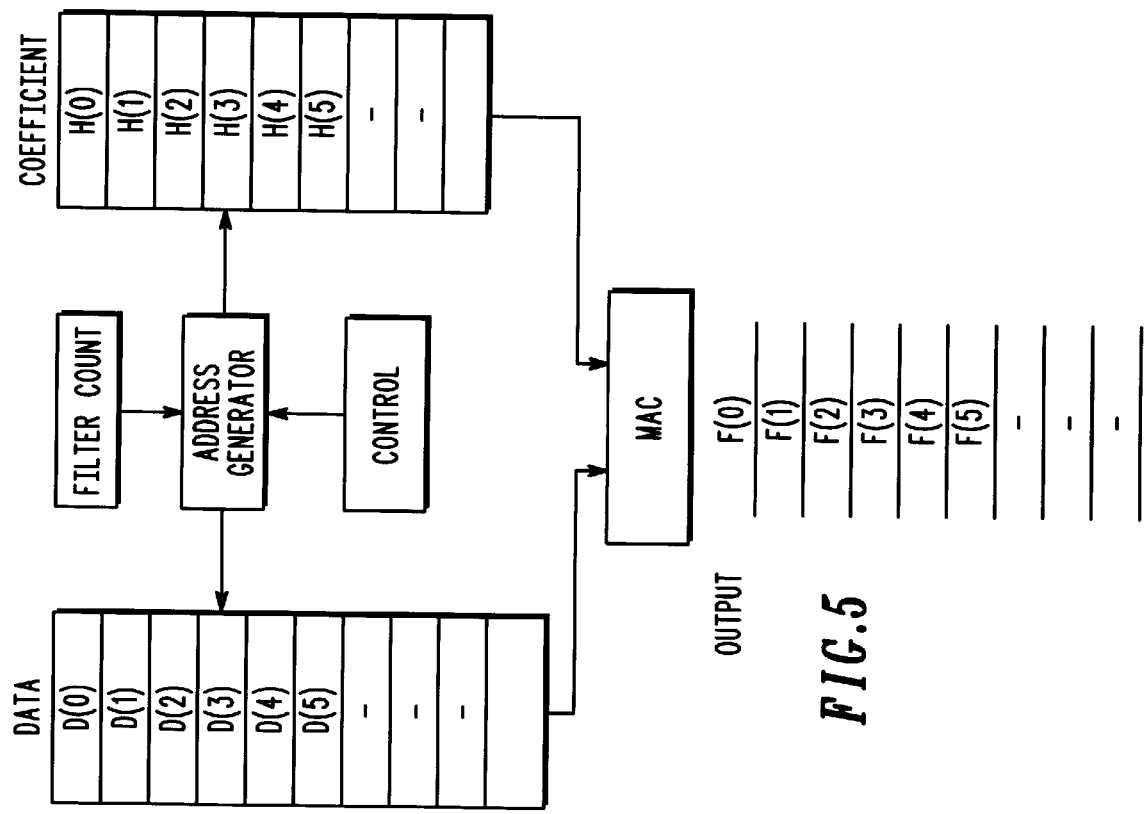
Figure 4:
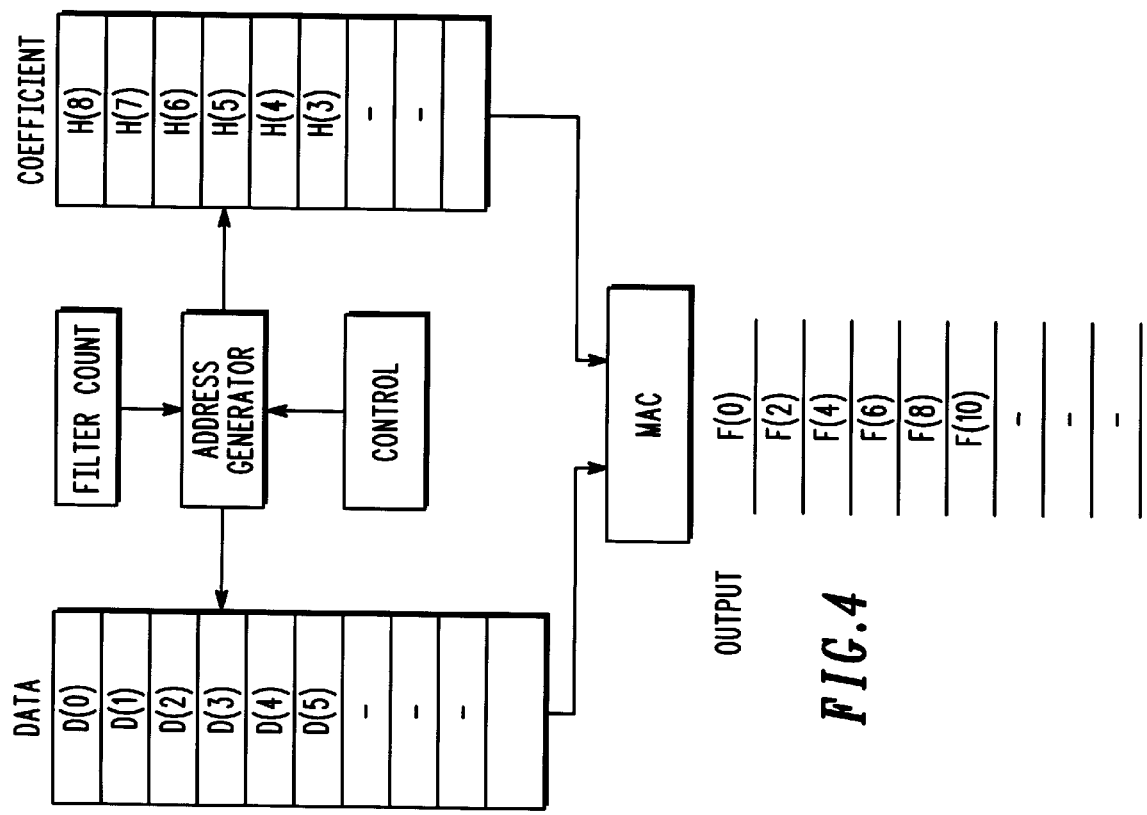
Figure 7:
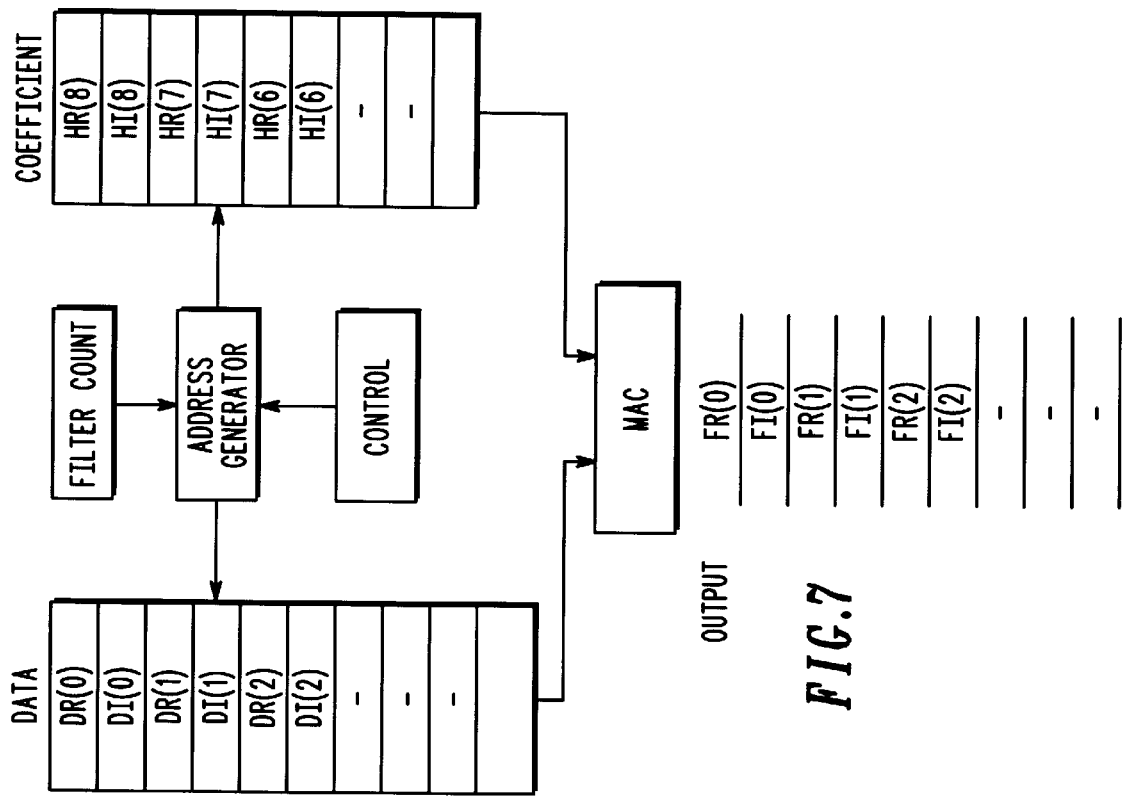
Figure 6:
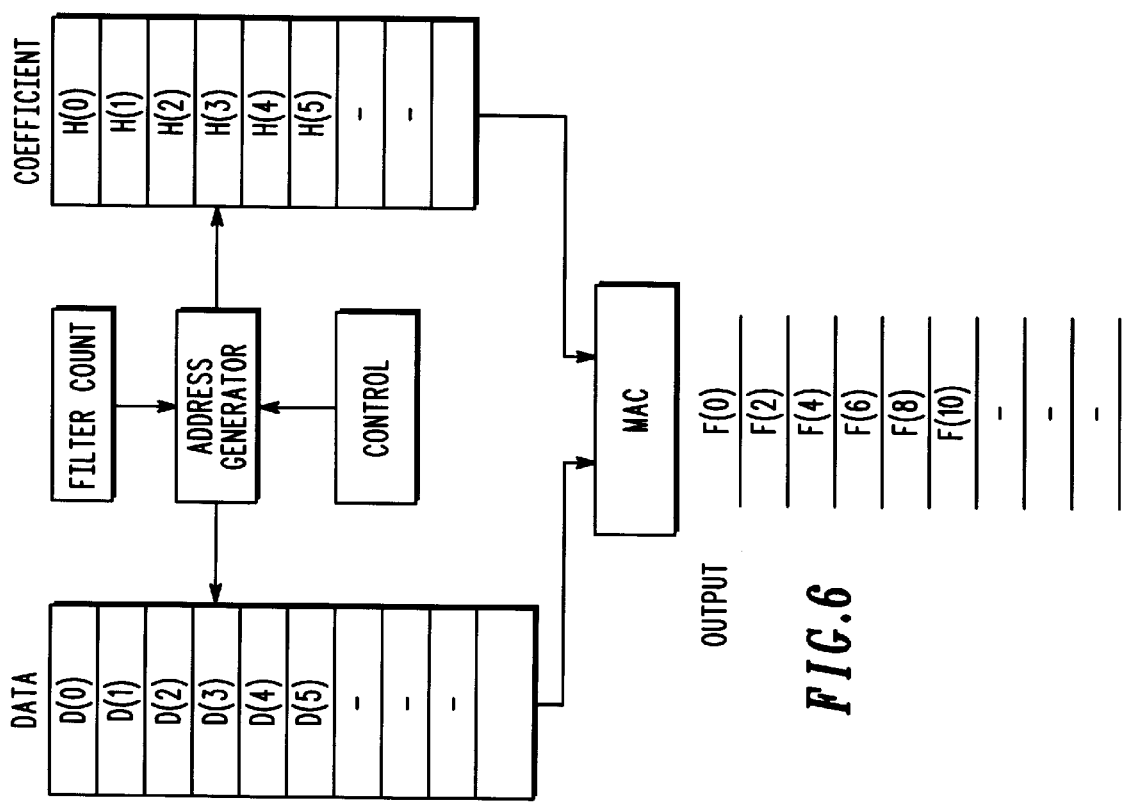
Figure 9:
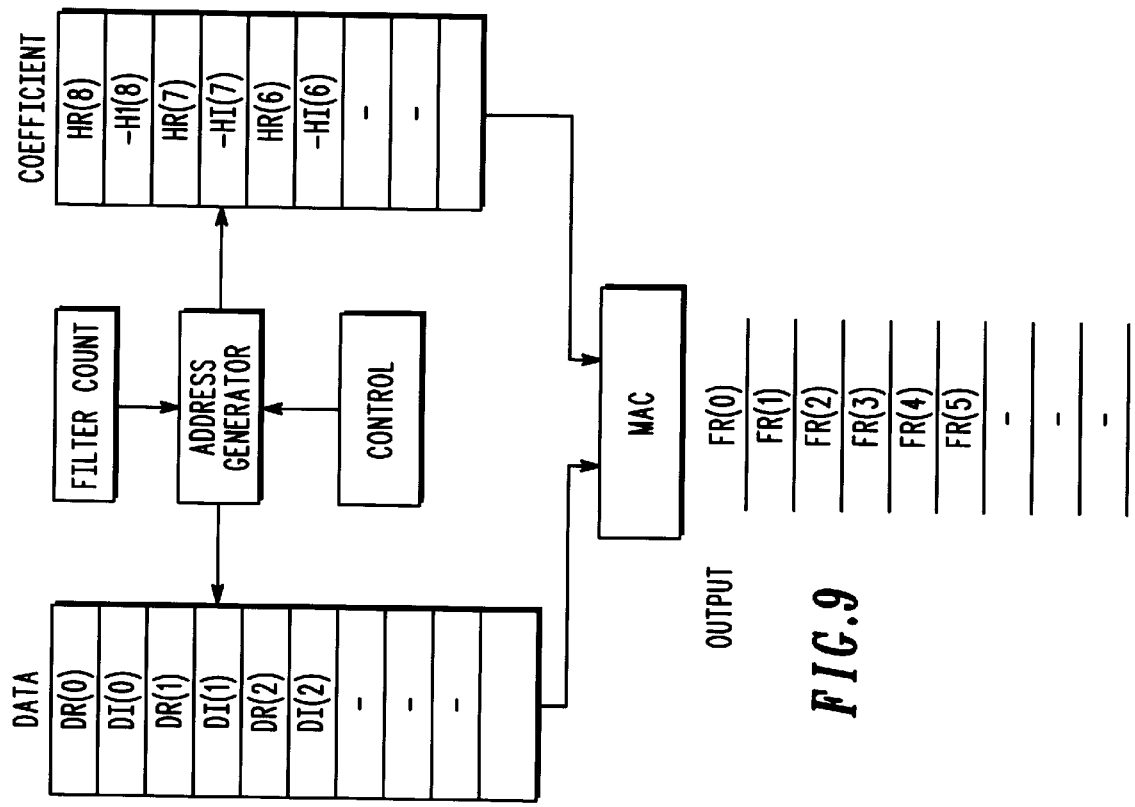
Figure 8:
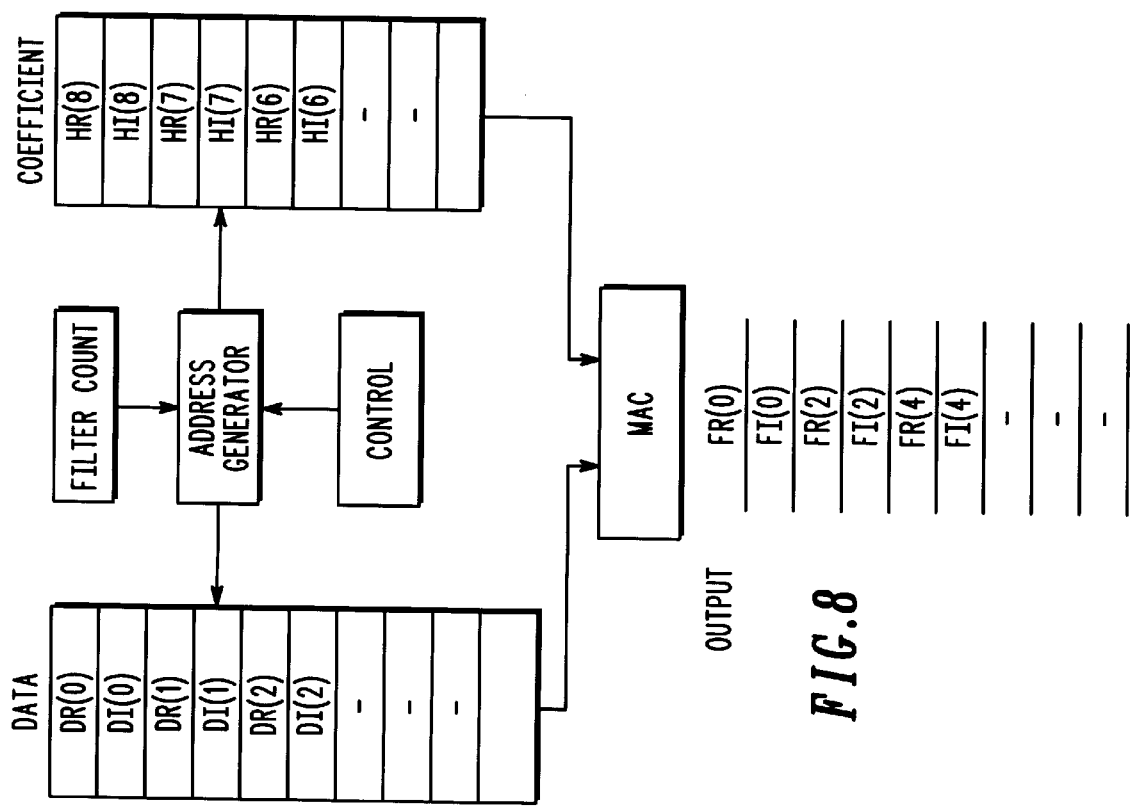
Figure 11:
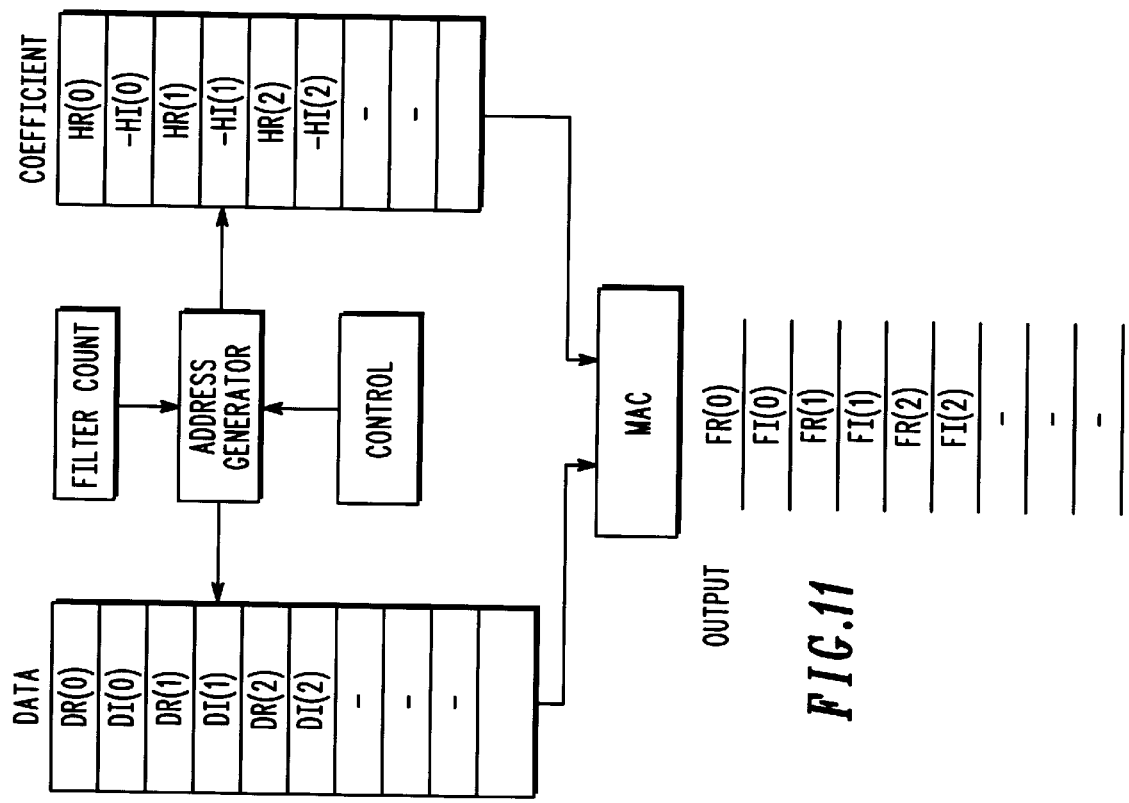
Figure 10:
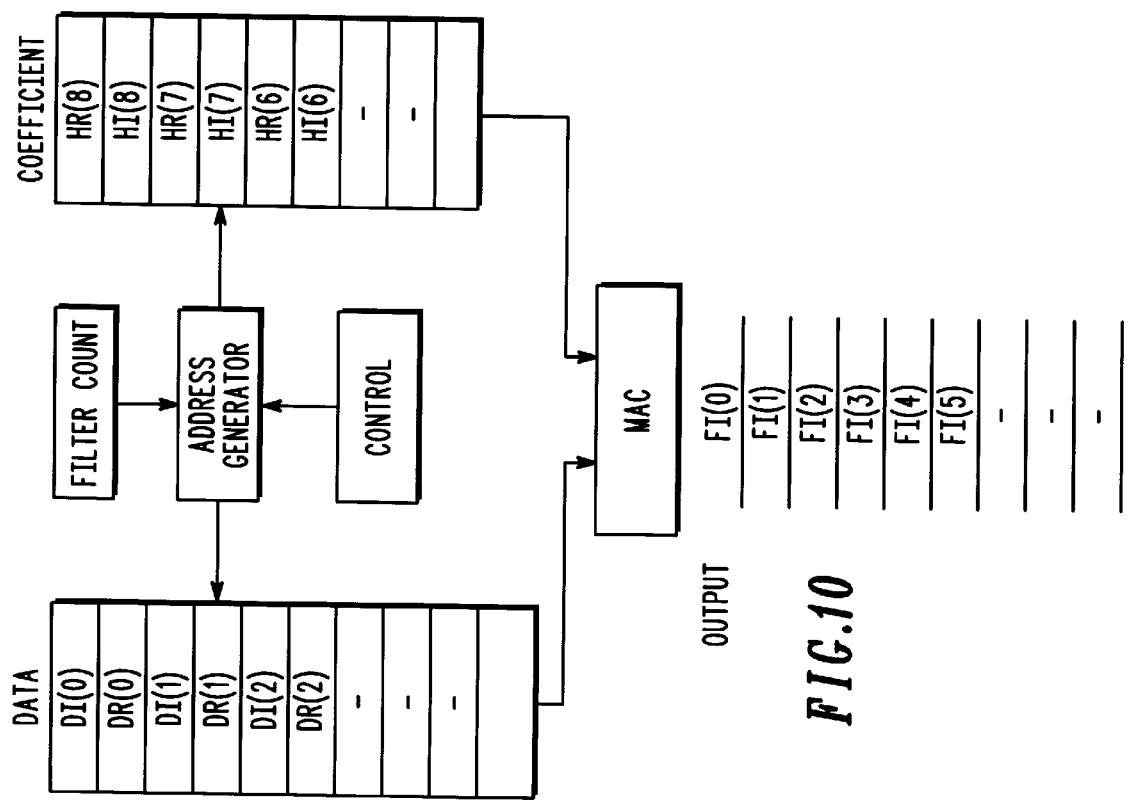
Figure 12:
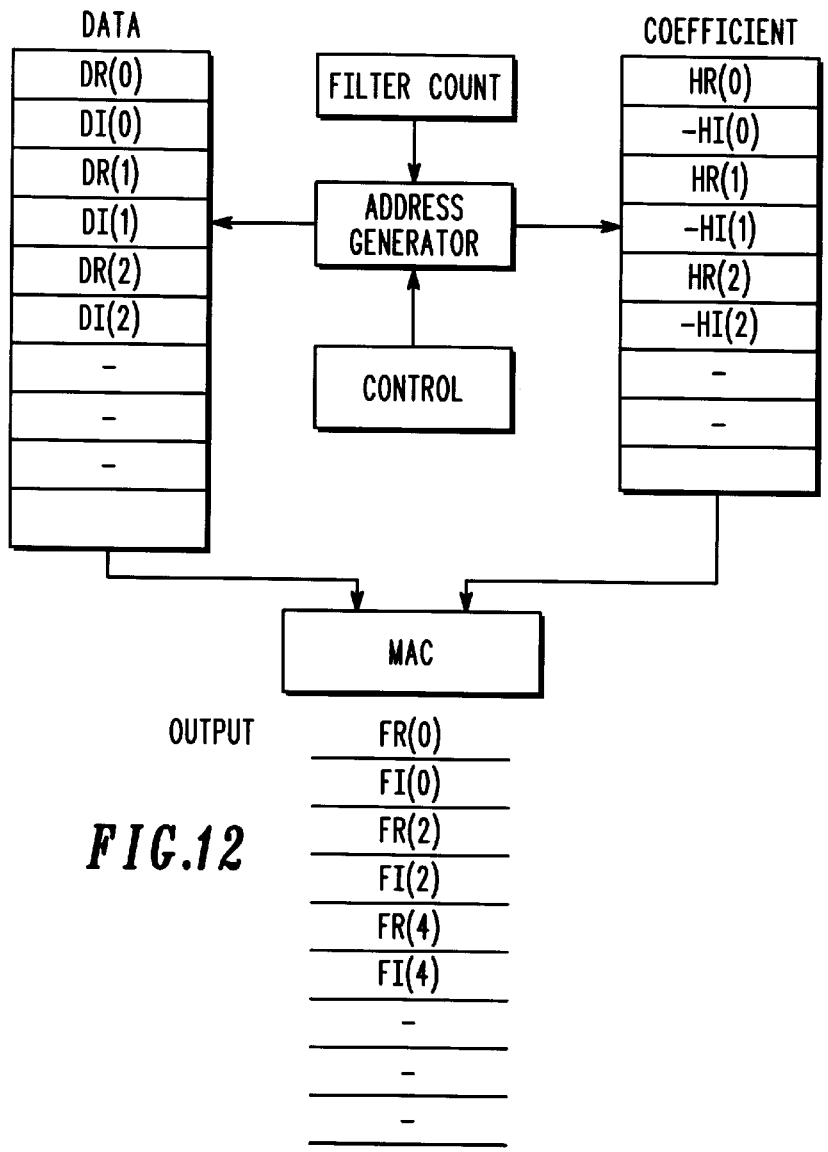
Figure 15:
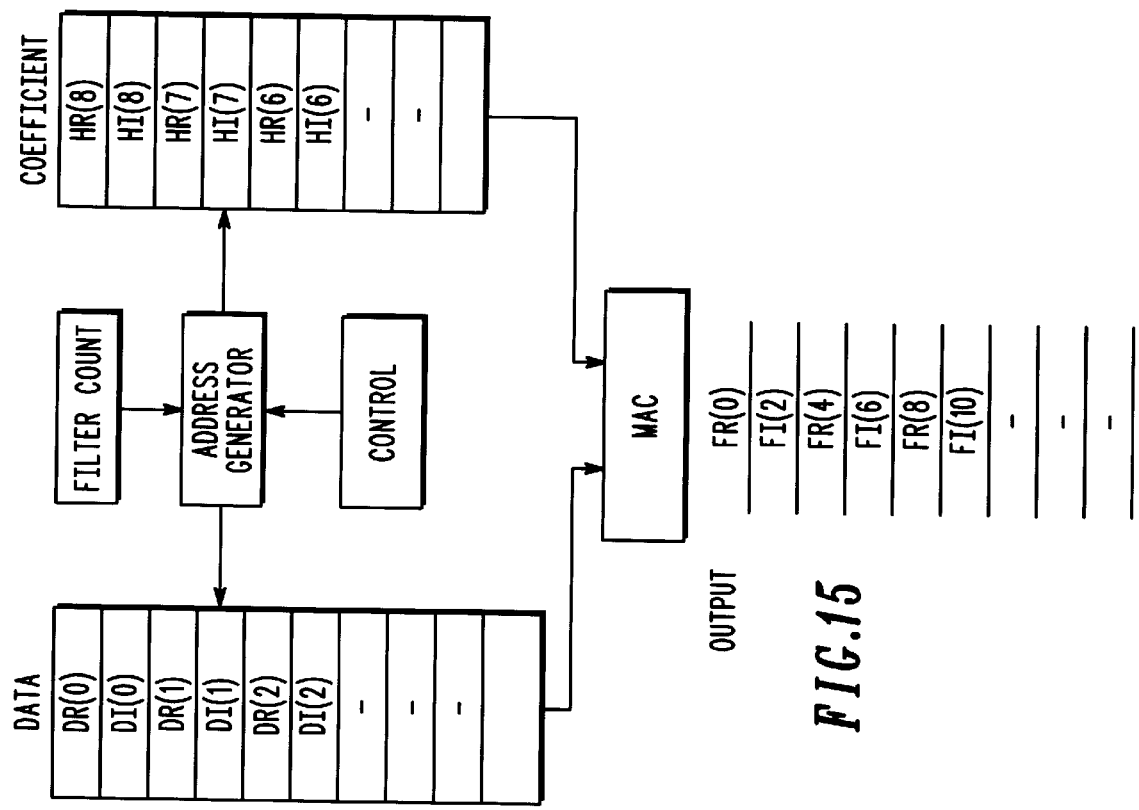
FIG. 14 through FIG. 19 depict the general data organization as shown in FIG. 2 for varying decimation values of correlation and matched filtering for modes 2 and 3 as applied to the hardware architecture of FIG. 1.
Figure 14:
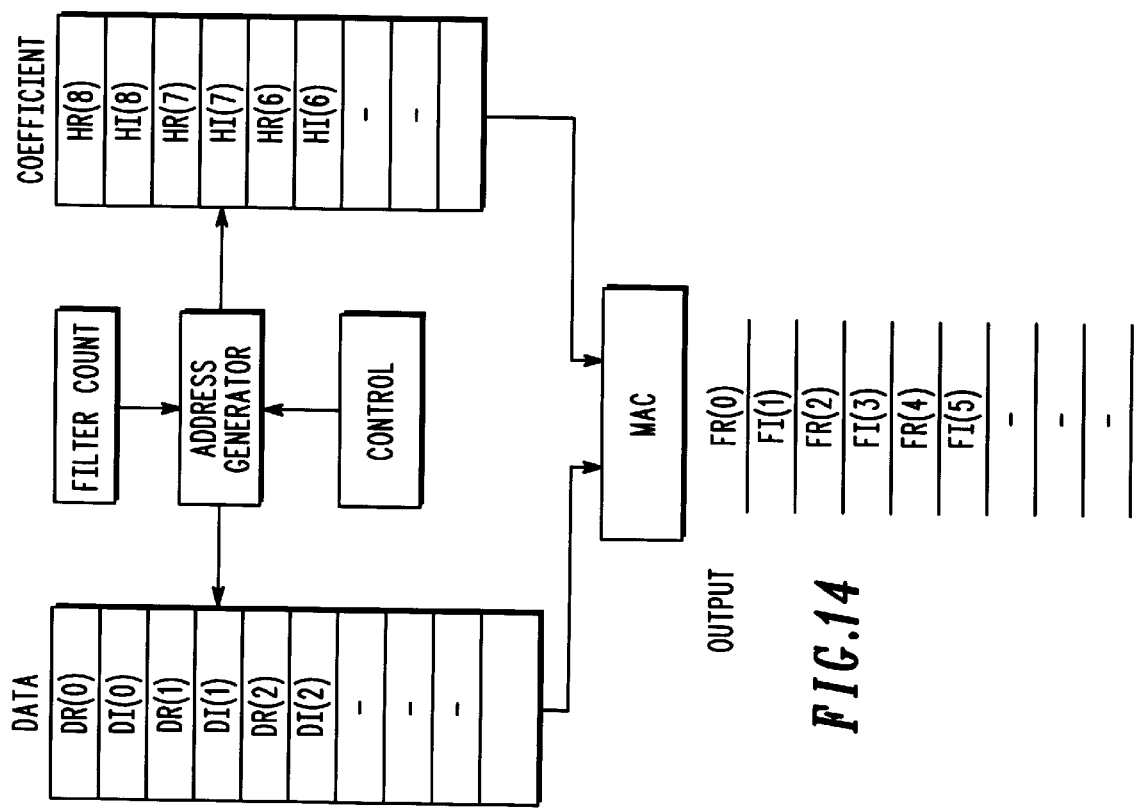
Figures 16, 17:
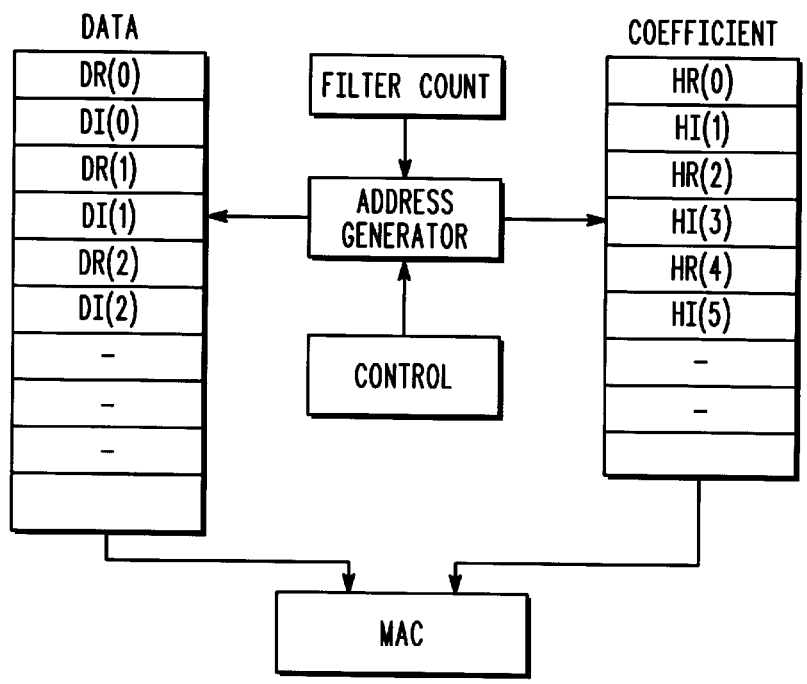
Figures 18, 19:
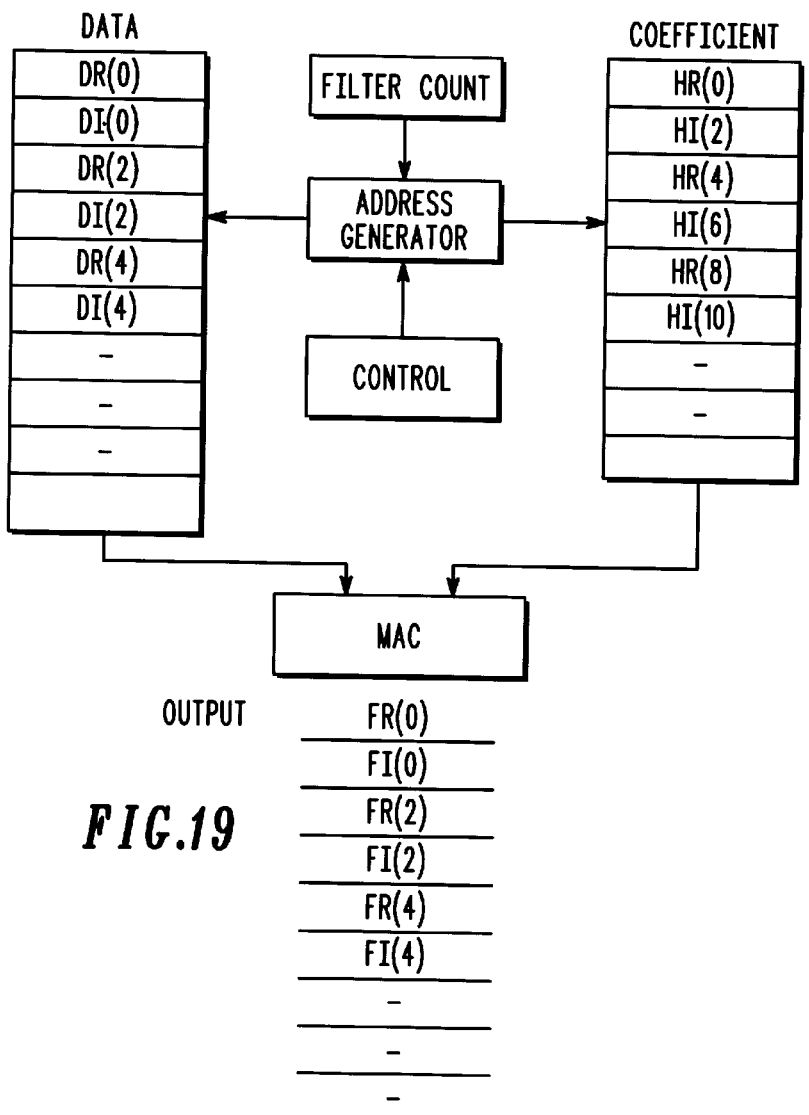

An additional No_Decimation/Decimation_by_2 mode bit was defined to support T-Spaced and T/2-Spaced communication systems. As such, the three programmable bits enable efficient implementation of a wide range of FIR filtering applications, some of which are listed and briefly described below:

Real convolution FIR filter (FIG. 3);
Real convolution FIR filter with output decimation by 2 (FIG. 4);
Real correlation FIR filter (FIG. 5);
Real correlation FIR filter with output decimation by 2 (FIG. 6);
Complex convolution FIR filter (FIG. 7);
Complex convolution FIR filter with output decimation by 2 (FIG. 8);
Complex convolution FIR filter generating real outputs only (FIG. 9);
Complex convolution FIR filter generating imaginary outputs only (FIG. 10);
Complex correlation FIR filter (FIG. 11);
Complex correlation FIR filter with output decimation by 2 (FIG. 12);
Complex FIR filter generating Pure Real/Pure Imaginary outputs alternately (FIG. 14);
Complex FIR filter generating alternate Pure Real/Pure Imaginary outputs decimated by 2 (FIG. 15);
Complex correlation between a full complex data sequence and a complex sequence composed of alternating Pure_Real/Pure_Imaginary data elements (FIGS. 16 and 17);
Complex correlation between a full complex data sequence oversampled by 2 and a complex sequence composed of alternating Pure Real/Pure Imaginary data elements (FIGS. 18 and 19).

The hardware architecture of the filter co-processor in accordance with the invention is compatible with the GSM telecommunication standard. In GSM, time division multiple access (TDMA) is used with a 4.615 millisecond frame structure that contains 8 timeslots. Each timeslot consists of 156.25 bits. For normal data burst, there are two 58 encrypted data bits, 26 training sequence bits, 6 tail bits and 8.25 guard bits. For an access data burst, there are 36 encrypted data bits, 41 training sequence bits, 8 extended tail bits, 3 tail bits and 68.25 extended guard bits. The modulation scheme is deferentially encoded Gaussian filtered MSK (GMSK).

FIG. 3 through FIG. 12 depict the general data organization as shown in FIG. 2 for varying decimation values of correlation and convolution for modes 0 and 1 as applied to the hardware architecture of FIG. 1. For each figure, the steps to initialize and process the data is provided in bullet form, with the applicable equation used to perform the processing also noted.

Real convolution FIR filter (FIG. 3)

Equation $$F(n) = \sum_{i=0}^{N-1} H(i) \cdot D(n-i)$$

Initialization

Set mode & filter count (=# of coeff values).

Init coefficients in coeff bank in reverse order.
    Core executes #filter_count writes.

Processing

If input data buffer empty, trigger Core/DMA to transfer up to 4 new data words.

Init data in data bank in direct order Core/DMA executes #filter_count writes.

Compute F(n), store result, trigger Core/DMA.

Get new data word into data bank and increment data bank pointer.

Real convolution FIR filter with output decimation by 2 (FIG. 4)

Equation $$F(n|_{even}) = \sum_{i=0}^{N-1} H(i) \cdot D(n-i)$$

Initialization

Set mode & filter count (=# of coeff values).

Init coefficients in coeff bank in reverse order.
    Core executes #filter_count writes.

Processing

If input data buffer empty, trigger Core/DMA to transfer up to 4 new data words.

Init data in data bank in direct order Core/DMA executes #filter_count writes.

Compute F(n), store result, trigger Core/DMA.
Get new data word into data bank and increment data bank pointer.
Get new data word into data bank and increment data bank pointer.

Real correlation FIR filter (FIG. 5)

Equation $$F(n) = \sum_{i=0}^{N-1} H(i) \cdot D(n+i)$$

Initialization
Set mode & filter count (=# of coeff values).
Init coefficients in coeff bank in direct order.
Core executes #filter_count writes.
Processing
If input data buffer empty, trigger Core/DMA to transfer up to 4 new data words.
Init data in data bank in direct order Core/DMA executes #filter_count writes.
Compute F(n), store result, trigger Core/DMA.
Get new data word into data bank and increment data bank pointer.

Real correlation FIR filter with output decimation by 2 (FIG. 6)

Equation $$F(n|_{even}) = \sum_{i=0}^{N-1} H(i) \cdot D(n+i)$$

Initialization
Set mode & filter count (=# of coeff values).
Init coefficients in coeff bank in direct order.
Core executes #filter_count writes.
Processing
If input data buffer empty, trigger Core/DMA to transfer up to 4 new data words.
Init data in data bank in direct order Core/DMA executes #filter_count writes.
Compute F(n), store result, trigger Core/DMA.
Get new data word into data bank and increment data bank pointer.
Get new data word into data bank and increment data bank pointer.

Complex convolution FIR filter (FIG. 7)

Equation $$FR(n) = \sum_{i=0}^{N-1} (HR(i) \cdot DR(n-i)) - (HI(i) \cdot DI(n-i))$$

$$FI(n) = \sum_{i=0}^{N-1} (HR(i) \cdot DI(n-i)) + (HI(i) \cdot DR(n-i))$$

Initialization
Set mode & filter count (=# of coeff values).
Init coefficients in coeff bank in direct order.
Core executes #filter_count writes.
Processing
If input data buffer empty, trigger Core/DMA to transfer 2 or 4 new data words.
Init data in data bank in direct order Core/DMA executes #filter_count writes.
Compute FR(n), store result, trigger Core/DMA.
Compute FI(n), store result, trigger Core/DMA.
Get new data word (DR), incr. data bank pointer.
Get new data word (DI), incr. data bank pointer.

Complex convolution FIR filter with output decimation by 2 (FIG. 8)

Equation $$FR(n|_{even}) = \sum_{i=0}^{N-1} (HR(i) \cdot DR(n-i)) - (HI(i) \cdot DI(n-i))$$

$$FI(n|_{even}) = \sum_{i=0}^{N-1} (HR(i) \cdot DI(n-i)) + (HI(i) \cdot DR(n-i))$$

Initialization
Set mode & filter count (=# of coeff values).
Init coefficients in coeff bank in direct order.
Core executes #filter_count writes.
Processing
If input data buffer empty, trigger Core/DMA to transfer 2 or 4 new data words.
Init data in data bank in direct order Core/DMA executes #filter_count writes.
Compute FR(n), store result, trigger Core/DMA.
Compute FI(n), store result, trigger Core/DMA.
Get new data word (DR), incr. data bank pointer.
Get new data word (DI), incr. data bank pointer.
Get new data word (DR), incr. data bank pointer.
Get new data word (DI), incr. data bank pointer.

Complex convolution FIR filter generating real outputs only (FIG. 9)

Equation $$FR(n) = \sum_{i=0}^{N-1} (HR(i) \cdot DR(n-i)) - (HI(i) \cdot DI(n-i))$$

Initialization
Set mode & filter count (=# of coeff values).
Init coefficients in coeff bank in reverse order, while imaginary coefficients are negated first.
Core executes #filter_count writes.
Processing
If input data buffer empty, trigger Core/DMA to transfer 2 or 4 new data words.
Init data in data bank in direct order Core/DMA executes #filter_count writes.
Compute FR(n), store result, trigger Core/DMA.
Get new data word (DR), incr. data bank pointer.
Get new data word (DI), incr. data bank pointer.

Complex convolution FIR filter generating
imaginary outputs only (FIG. 10)

Equation $$FI(n) = \sum_{i=0}^{N-1} (HR(i) \cdot DI(n-i)) + (HI(i) \cdot DR(n-i))$$

Initialization

Set mode & filter count (=# of coeff values).
Data organized in Im/Re pairs.
Init coefficients in coeff bank in reverse order, while imaginary coefficients are negated first.
Core executes #filter_count writes.

Processing

If input data buffer empty, trigger Core/DMA to transfer 2 or 4 new data words.
Init data in data bank in direct order Core/DMA executes #filter_count writes.
Compute FI(n), store result, trigger Core/DMA.
Get new data word (DI), incr. data bank pointer.
Get new data word (DR), incr. data bank pointer.

Complex correlation FIR filter (FIG. 11)

Equation $$FR(n) = \sum_{i=0}^{N-1} (HR(i) \cdot DR(n+i)) + (HI(i) \cdot DI(n+i))$$

$$FI(n) = \sum_{i=0}^{N-1} (HR(i) \cdot DI(n+i)) - (HI(i) \cdot DR(n+i))$$

Initialization

Set mode & filter count (=# of coeff values).
Init coefficients in coeff bank in direct order, while imaginary coefficients are negated first.
Core executes #filter_count writes.

Processing

If input data buffer empty, trigger Core/DMA to transfer 2 or 4 new data words.
Init data in data bank in direct order Core/DMA executes #filter_count writes.
Compute FR(n), store result, trigger Core/DMA.
Compute FI(n), store result, trigger Core/DMA.
Get new data word (DR), incr. data bank pointer.
Get new data word (DI), incr. data bank pointer.

Complex correlation FIR filter with output decimation by 2 (FIG. 12)

Equation $$FR(n|_{even}) = \sum_{i=0}^{N-1} (HR(i) \cdot DR(n+i)) + (HI(i) \cdot DI(n+i))$$

$$FI(n|_{even}) = \sum_{i=0}^{N-1} (HR(i) \cdot DI(n+i)) - (HI(i) \cdot DR(n+i))$$

Initialization

Set mode & filter count (=# of coeff values).
Init coefficients in coeff bank in direct order, while imaginary coefficients are negated first.
Core executes #filter_count writes.

Processing

If input data buffer empty, trigger Core/DMA to transfer 2 or 4 new data words.
Init data in data bank in direct order Core/DMA executes #filter_count writes.
Compute FR(n), store result, trigger Core/DMA.
Compute FI(n), store result, trigger Core/DMA.
Get new data word (DR), incr. data bank pointer.
Get new data word (DI), incr. data bank pointer.
Get new data word (DR), incr. data bank pointer.
Get new data word (DI), incr. data bank pointer.

Figure 13:
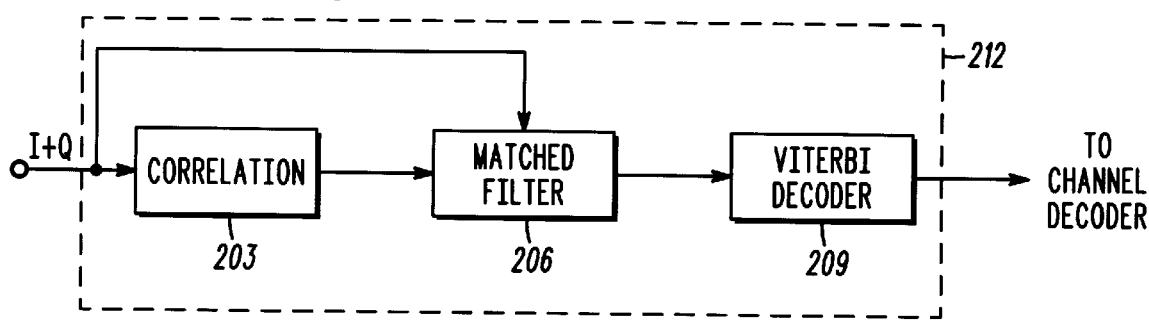
FIG. 13 generally depicts an equalizer capable of benefiting from the filter co-processor in accordance with the invention.

The hardware architecture depicted in FIG. 1 is particularly beneficial when used in an equalizer of a receiver. Such an equalizer is generally depicted in FIG. 13, where orthogonal signals I and Q are input into a correlation block 203. Important to note is that the invention takes advantage of the orthogonality between I and Q, thus the filter co-processor of FIG. 1 can be beneficially implemented in any orthogonally modulated system. Continuing, the correlation block 203 has as its output input into a matched filter 206. The matched filter 206 also has as input orthogonal signals I and Q. The output of the matched filter 206 is input into a Viterbi decoder 209. The correlation block 203, the matched filter 206 and the Viterbi decoder 209 generally comprise the equalizer as is well known in the art. The output of the Viterbi decoder 209 is input into a channel decoder (not shown) which performs further processing of the received signal.

FIG. 14 through FIG. 19 depict the general data organization as shown in FIG. 2 for varying decimation values of correlation (mode 3) and matched filtering (mode 2) as applied to the hardware architecture of FIG. 1. The first analysis is of the correlation process. In the correlation process, the input data is correlated with a sync word pattern in the form of a mid-amble. Due to the nature of the GMSK modulation scheme of GSM, the sync word alternates between purely real and purely imaginary values. Normally, a full complex multiplication would require four multiply and accumulate operations. Because the nature of sync word, only two multiplication's are necessary since either the real or imaginary portion is "0" (i.e., orthogonal). The filter co-processor of FIG. 1 takes advantage of this characteristic in order to reduce the calculation time in half. Again, for each figure, the steps to initialize and process the data is provided in bullet form, with the applicable equation used to perform the processing also noted.

Complex correlation between a full complex data sequence and a complex sequence composed of alternating Pure_Real/Pure_Imaginary data elements (FIG. 16 and 17)

The training sequence (received data) is complex (a pair of I&Q samples per bit). The midamble sequence (reference data) consists of alternating Pure_Re/Pure_Im complex values (one pure complex number per bit), forming the table shown in FIG. 16.

Equation

The Correlation function is:

$$FR(n) = \sum_{i=0}^{N-1} (HR(i) \cdot DR(n+i)) + (HI(i) \cdot DI(n+i))$$

$$FI(n) = \sum_{i=0}^{N-1} (HR(i) \cdot DI(n+i)) - (HI(i) \cdot DR(n+i))$$

Taking advantage of the orthogonal components of the midamble sequence we get:

$$FR(n) = \sum_{i=0}^{N/2-1} (HR(2i) \cdot DR(n+2i)) + (HI(2i+1) \cdot DI(n+2i+1))$$

$$FI(n) = \sum_{i=0}^{N/2-1} (HR(2i) \cdot DI(n+2i)) - (HI(2i+1) \cdot DR(n+2i+1))$$

Accordingly, a complex correlation output is calculated for each complex input requiring half of the MAC operations.

Initialization

Set mode & filter count (=# of coeff values).

Init coefficients in coeff bank in direct order.

Core executes #filter_count writes.

Processing

Whenever input data buffer empty, trigger Core/DMA to transfer 2 or 4 new data samples.

Init data in data bank in direct order Core/DMA executes 2x #filter_count writes.

Compute FR(n), store result, trigger Core/DMA.

Compute FI(n), store result, trigger Core/DMA.

Get new data word (DR), incr. data bank pointer.

Get new data word (DI), incr. data bank pointer.

Complex correlation between a full complex data sequence oversampled by 2 and a complex sequence composed of alternating Pure_Real/Pure_Imaginary data elements (FIGS. 18 and 19).

The training sequence (received data) is 2x oversampled (2x I&Q samples per bit). The midamble sequence (reference data) consists of alternate Pure_Re/Pure_Im complex values (one pure complex number per bit). Prior to correlation, the midamble sequence is 2x interpolated by adding a complex zero in between the pure complex values, forming the table shown in FIG. 18.

Equation

The Correlation function is:

$$FR(n) = \sum_{i=0}^{N-1} (HR(i) \cdot DR(n+i)) + (HI(i) \cdot DI(n+i))$$

$$FI(n) = \sum_{i=0}^{N-1} (HR(i) \cdot DI(n+i)) - (HI(i) \cdot DR(n+i))$$

Taking advantage of the orthogonal components of the interpolated midamble sequence we get:

$$FR(n) = \sum_{i=0}^{N/4-1} (HR(4i) \cdot DR(n+4i)) + (HI(4i+2) \cdot DI(n+4i+2))$$

$$FI(n) = \sum_{i=0}^{N/4-1} (HR(4i) \cdot DI(n+4i)) - (HI(4i+2) \cdot DR(n+4i+2))$$

It can be easily shown that when n is "even", the filter outputs are independent of the "odd" input samples, and when n is "odd", the filter outputs are independent of the "even" input samples. As a result, even and odd filter outputs can be calculated separately, requiring half of the data memory bank size.

Initialization

Set mode & filter count (=# of coeff values).

Init coefficients in coeff bank in direct order.

Core executes #filter_count writes.

Processing

Whenever input data buffer empty, trigger Core/DMA to transfer 2 or 4 new data samples.

Init data in data bank in direct order Core/DMA executes 2x #filter_count writes, even only or odd only.

Compute FR(n), store result, trigger Core/DMA.

Compute FI(n), store result, trigger Core/DMA.

Get new data word (DR), incr. data bank pointer.

Get new data word (DI), incr. data bank pointer.

The second analysis is of the matched filtering process. In the matched filtering process, two elements specific to the equalization process used in the GSM system are exploited. First, only alternating real and imaginary output values are calculated. This once again takes advantage of the orthogonal nature of the GMSK modulation scheme. In addition, the output data is decimated by two in order to process 2X oversampled data and provide a single sample per bit output. The output sequence is treated as a purely real sequence for further processing by the Viterbi Decoder 209. Once again, the matched filtering mode of the filter co-processor takes advantage of these characteristics in order to reduce the calculation time relative to implementing the complete complex multiplications. Again, for each figure, the steps to initialize and process the data is provided in bullet form, with the applicable equation used to perform the processing also noted.

Complex FIR filter generating Pure Real/Pure Imaginary outputs alternately (FIG 14)

Equation $$FR(n|_{even}) = \sum_{i=0}^{N-1} (HR(i) \cdot DR(n-i)) - (HI(i) \cdot DI(n-i))$$

$$FI(n|_{odd}) = \sum_{i=0}^{N-1} (HR(i) \cdot DI(n-i)) + (HI(i) \cdot DR(n-i))$$

Initialization

Set mode & filter count (=# of coeff values).

Init coefficients in coeff bank in reverse order.

Core executes #filter_count writes.

Processing

If input data buffer empty, trigger Core/DMA to transfer 2 or 4 new data words.

Init data in data bank in direct order Core/DMA executes #filter_count writes.

Compute FR(n), store result, trigger Core/DMA.

Get new data word (DR), incr. data bank pointer.

Get new data word (DI), incr. data bank pointer.

Compute FI(n), store result, trigger Core/DMA.

Get new data word (DR), incr. data bank pointer.

Get new data word (DI), incr. data bank pointer.

Complex FIR filter generating alternate Pure Real/ Pure Imaginary outputs decimated by 2 (FIG. 15)

Equation $$FR(n)|_{0,4,8,etc.} = \sum_{i=0}^{N-1} (HR(i) \cdot DR(n-i)) - (HI(i) \cdot DI(n-i))$$

$$FI(n)|_{2,6,10,etc.} = \sum_{i=0}^{N-1} (HR(i) \cdot DI(n-i)) + (HI(i) \cdot DR(n-i))$$

Initialization

Set mode & filter count (=# of coeff values).

Init coefficients in coeff bank in reverse order.

Processing

If input data buffer empty, trigger Core/DMA to transfer 4 new data words (2 complex data).

Init data in direct order (Core/DMA writes).

Compute FR(n), store result, trigger Core/DMA.

Get new data word (DR), incr. data bank pointer.

Get new data word (DI), incr. data bank pointer.

Get new data word (DR), incr. data bank pointer.

Get new data word (DI), incr. data bank pointer.

Compute FI(n), store result, trigger Core/DMA.

Get new data word (DR), incr. data bank pointer.

Get new data word (DI), incr. data bank pointer.

Get new data word (DR), incr. data bank pointer.

Get new data word (DI), incr. data bank pointer.

Previously, these tasks have been accomplished by firmware running on the processor core. The following table illustrates the improvements made by using the filter co-processor.

TABLE 1

Normal Burst comparison

| Over sampled Data | Filter mode | Mode | Data length | Filter length | No. of Outputs | No. of cycles | Duration @ 80 MHz |
|---|---|---|---|---|---|---|---|
| 2X | Matched Filter | 2 | 61 × 2 | 9 × 2 | 61 | 1474 | 18.5 us |
| 2X | Correlation | 3 | 26 × 2 | 26 | 52 × 2 | 3078 | 38.5 us |
| 2X | Matched Filter | Core | 61 × 2 | 9 × 2 | 61 | 4761 | 59 us |
| 2X | Correlation | Core | 18 × 2 | 18 | 36 × 2 | 4201 | 52.5 us |

TABLE 2

Access Burst comparison

| Over sampled Data | Filter mode | Mode | Data length | Filter length | No. of Outputs | No. of cycles | Duration @ 80 MHz |
|---|---|---|---|---|---|---|---|
| 2X | Matched Filter | 2 | 36 × 2 | 9 × 2 | 36 | 924 | 11.6 us |
| 2X | Correlation | 3 | 41 × 2 | 41 | 82 × 2 | 7308 | 91.5 us |
| 2X | Matched Filter | Core | 61 × 2 | 9 × 2 | 61 | 2786 | 34.8 us |
| 2X | Correlation | Core | 41 × 2 | 41 | 82 × 2 | 16826 | 210.3 us |

Figure 20:
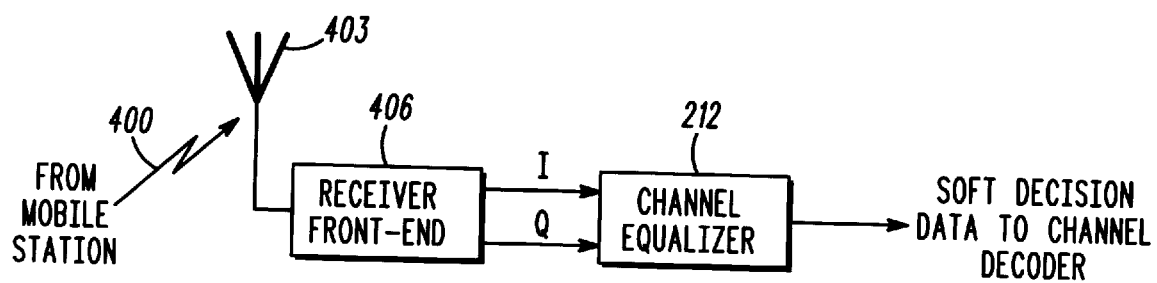
FIG. 20 generally depicts the filter co-processor of FIG. 1 beneficially implemented in a receiver of a wireless communication system.

FIG. 20 generally depicts the filter co-processor of FIG. 1 beneficially implemented in a receiver of a wireless communication system. Generally stated, the receiver receives an orthogonally modulated signal 400 in the receiver front-end 406. The orthogonally modulated signal 400 is comprised of a plurality of symbols. In the preferred embodiment, the symbols are received in first and second branches of the receiver front-end 406 and the reception of the symbols between the first and second branches is offset by a predetermined time period. In the channel equalizer 212 implementing the filter co-processor hardware depicted in FIG. 1, even numbered symbols from the first branch of the receiver are independently decoded and odd numbered symbols from the second branch of the receiver are independently decoded to produce decoded information for each branch of the receiver. The decoded information for each branch of the receiver is then combined and processed by a receiver back-end (not shown).

In the preferred embodiment, the orthogonally modulated signal further comprises an offset Quadrature Phase Shift Keyed (QPSK) modulated signal which is specifically a Gaussian Minimum Shift Keying (GMSK) modulated signal. Other types of modulation, such as Minimum Shift Keying (MSK) modulation, may likewise be employed. The receiver of FIG. 20 is compatible with a time division multiple access (TDMA) air interface, and specifically the Groupe Special Mobile (GSM) TDMA air interface.

To even numbered symbols from the first branch of the receiver are independently decoded and odd numbered symbols from the second branch of the receiver are independently decoded to produce decoded information for each branch of the receiver. To perform the independent decoding, the I and Q data are correlated with a training sequence to estimate the channel impulse response before match filtering the estimated channel with the received data. The training sequence (reference data) consists of alternating Pure_Re/Pure_Im complex values (one pure complex number per bit) as shown in the table of FIG. 16. It then performs Maximum Likelihood Sequence Estimation (MLSE) and inter-symbol interference cancellation to perform the soft decision data sequence estimation. The soft decision data is then passed to the channel decoder (receiver back-end) for further processing. The filter co-processor as described herein and depicted in FIG. 1 performs the correlation process for the channel impulse response as well as the match filtering process of the received data with that estimated channel. By taking advantage of the GMSK modulation scheme of the GSM system, the number of steps to perform the correlation and matched filtering process is significantly reduced, thus resulting in a requirement for fewer DSPs per RF carrier.

While the invention has been particularly shown and described with reference to a particular embodiment, it will be understood by those skilled in the art that various changes in form and details may be made therein without departing from the spirit and scope of the invention.

What we claim is:

1. A filter co-processor comprising:

a first memory for storing data information;

a second memory for storing coefficients; and a controller for controlling a multiplier/accumulator to perform multiply/accumulate functions during a correlation process between the stored data information representing a complex data sequence and the stored coefficients representing a mid-amble sequence, where the mid-amble sequence comprises alternating pure real/pure imaginary complex values and the output of the correlation is decimated, the controller further coordinating retrieval of the stored data information and the stored coefficients.

2. A filter co-processor comprising:

a first memory for storing data information;

a second memory for storing coefficients; and a controller for controlling a multiplier/accumulator to perform multiply/accumulate functions during a correlation process between the stored data information representing a 2X oversampled complex data sequence and the stored coefficients representing a mid-amble sequence, the mid-amble sequence comprising 1X alternating pure real/pure imaginary complex values, the controller further coordinating retrieval of the stored data information and the stored coefficients.

3. A filter co-processor comprising:

a first memory for storing data information;

a second memory for storing coefficients; and a controller for controlling a multiplier/accumulator to perform multiply/accumulate functions during a matched filtering process where input data is complex, the stored coefficients related to the matched filtering are complex, and the output is a real sequence of alternating pure real/pure imaginary data, the controller further coordinating retrieval of the stored data information and the stored coefficients.

4. The filter co-processor of claim 3, wherein a mode of operation further comprises a decimation of the output of the matched filtering.

5. The filter co-processor of claim 3, wherein the filter co-processor generates an output for use by a Maximum Likelihood Sequence Estimation (MLSE) algorithm.

6. An equalizer for use in a receiver compatible with a wireless communication system, the equalizer comprising:

a filter co-processor including a first memory for storing data information and second memory for storing coefficients and a controller for controlling a multiplier/accumulator to perform multiply/accumulate functions in a first mode related to a correlation and a second mode related to a matched filtering, the filter co-processor further including:

a correlation block for correlating the stored data information representing a complex data sequence and the stored coefficients representing a mid-amble sequence, the mid-amble sequence comprising alternating pure real/pure imaginary complex values;

a matched filtering block for matched filtering complex input using complex coefficients and outputting a real sequence of alternating pure real/pure imaginary data; and a maximum likelihood sequence estimation block for estimating a signal transmitted in the wireless communication system based on the output of the matched filtering block.

* * * * *